L. B. SULLIVAN.
COOKING STOVE.
APPLICATION FILED SEPT. 1, 1920.
1,430,125.
Patented Sept. 26, 1922.
2 SHEETS—SHEET 1.
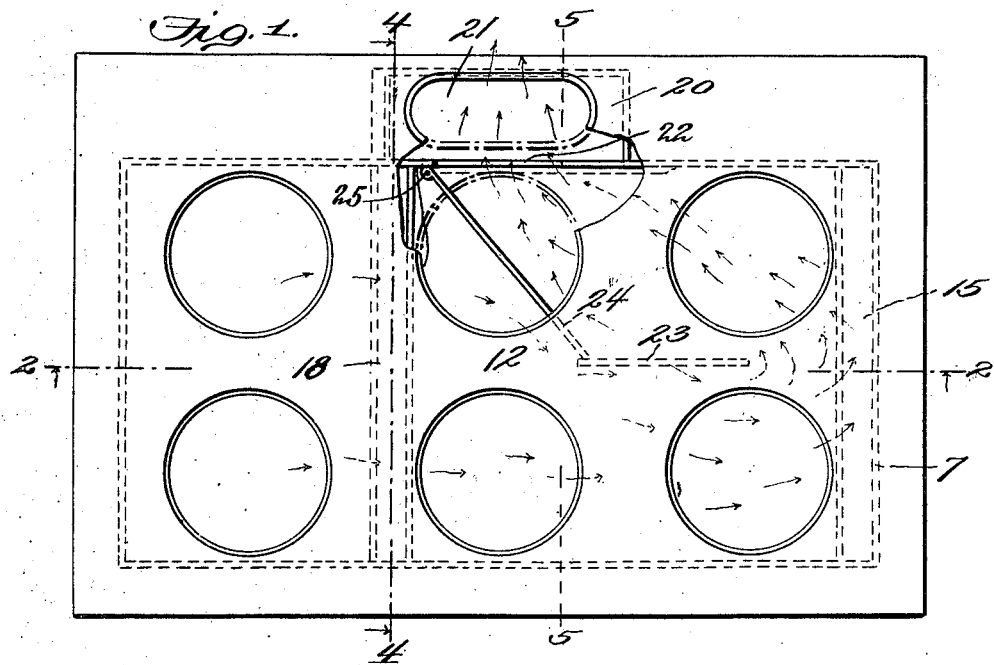
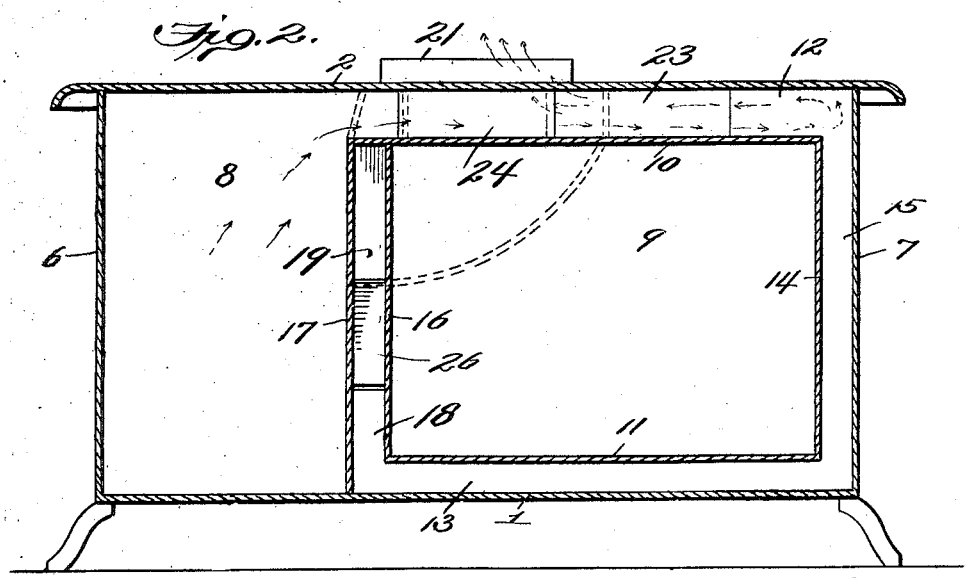
Witness
Inventor
Linn B. Sullivan
By *(Attorney)*

L. B. SULLIVAN.
COOKING STOVE.
APPLICATION FILED SEPT. 1, 1920.
1,430,125.
Patented Sept. 26, 1922.
2 SHEETS—SHEET 2.
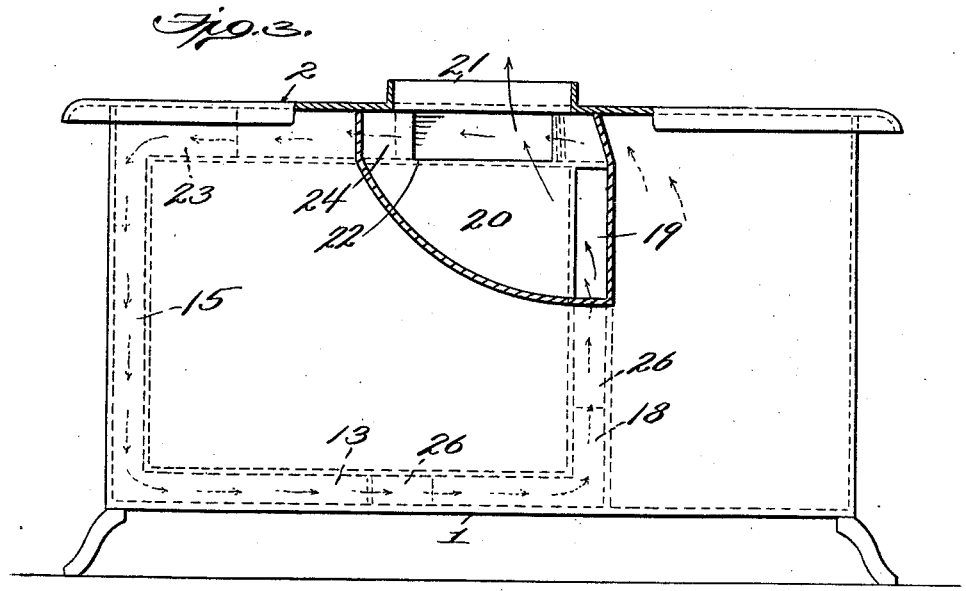
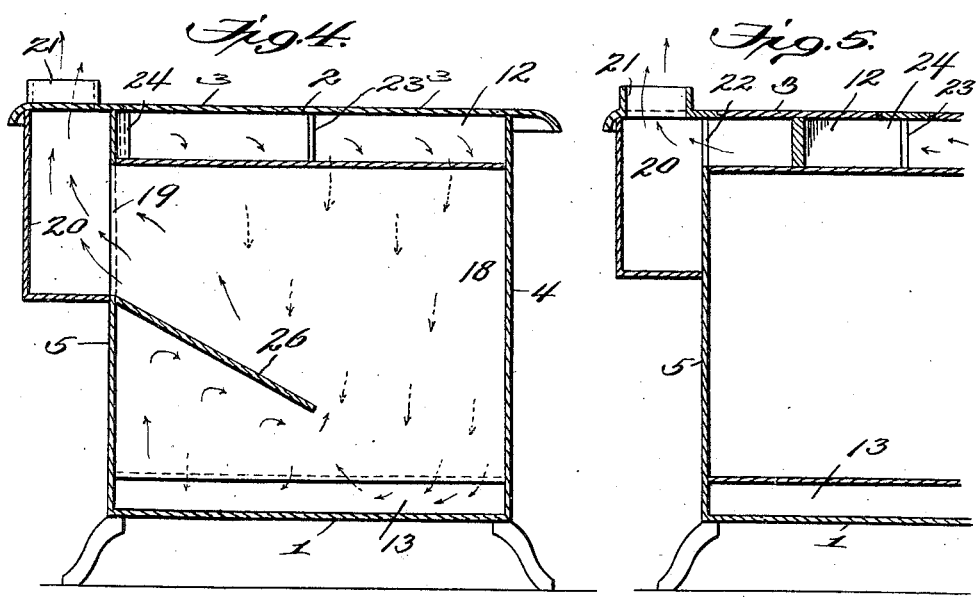
Witness
Inventor
Linn B. Sullivan
By
Attorney Patented Sept. 26, 1922.

1,430,125

UNITED STATES PATENT OFFICE.

LINN B. SULLIVAN, OF DECATUR, GEORGIA.

COOKING STOVE.

Application filed September 1, 1920. Serial No. 407,440.

*To all whom it may concern:*

Be it known that I, LINN B. SULLIVAN, a citizen of the United States, residing at Decatur, in the county of Dekalb and State of Georgia, have invented new and useful Improvements in Cooking Stoves, of which the following is a specification.

My present invention relates to improvements in cooking stoves, and more especially to stoves or ranges of the class having an oven for baking, as well as a top for cooking purposes generally.

The primary objects of the invention are to provide novel and improved means, whereby the entire top of the stove or all of the lids thereof will be heated uniformly and efficiently by the products of combustion, whether the draft be direct to the chimney exit or indirect, or around the oven, and to provide a better draft for and a more uniform distribution of the products of combustion and to obtain increased uniformity and efficiency in the heating of the oven when the products of combustion are caused to circulate around it.

To these and other ends, the invention consists in certain improvements and combinations and arrangements of parts, all as will be hereinafter more fully described, the features of novelty being pointed out particularly in the claims at the end of the specification.

In the accompanying drawing—

Figure 1 is a top plan view of a cooking stove or range constructed in accordance with the present invention;

Figure 2 represents a vertical section taken longitudinally through the stove, on the line 2—2 of Figure 1 and looking toward the rear;

Figure 3 is a rear elevation of the stove as shown in Figure 1, but showing the smoke-box in vertical section;

Figure 4 represents a transverse section through the stove on the line 4—4 of Figure 1; and Figure 5 represents a partial transverse section through the stove on the line 5—5 of Figure 1.

Similar parts are designated by the same reference characters in the several views.

The present invention is applicable generally to cooking stoves or ranges of the conventional type having a top which is usually provided with lids and intended for cooking purposes generally, and also an oven for baking purposes, the stoves or ranges of this general type as commonly used having dampers, or other devices for controlling the draft for the products of combustion, whereby these products of combustion may pass directly to the chimney exit, when it is desired to heat the top of the stove, or the products of combustion may be caused to circulate around the oven, when it is desired to heat the oven. The present invention provides improved means for controlling the draft, whereby a more thorough distribution of the products of combustion relatively to the top of the stove or range, is obtained, thus insuring uniform heating of the entire stove top, or all of the lids thereof so that all portions of the stove top, or all of the lids thereof may be used efficiently, whether the draft for the products of combustion be direct to the chimney exit or around the oven. The invention also provides means whereby the products of combustion, when the draft is around the oven, are distributed uniformly, thus insuring uniform and efficient heating of the oven at both ends, as well as the top and bottom thereof. The preferred embodiment of the invention is shown in the accompanying drawing and will be hereinafter described in detail, but it is to be understood, however, that the invention is not restricted to the precise construction shown, as equivalent constructions are contemplated, and these will be included within the scope of the claims.

In the present instance, the stove or range is of the conventional type having a top, adapted for cooking purpose, and also an oven, adapted for baking purposes. It comprises a bottom or base 1 which may be supported, as usual, upon legs, as shown, a top 2 which may be provided, as usual, with removable lids 3 to cover or uncover the cooking holes, six lids being shown in the present instance, which is the number usually employed, a front plate 4, a back plate 5 and end plates 6 and 7. These plates may be assembled in the usual or any suitable way, and the space formed within these plates is sub-divided to provide a combustion chamber 8 at one end, which may contain the usual or any suitable fire pot and an oven 9. The front plate 4 of the stove may be provided, as usual, with suitable doors to provide access to the fire pot and ash pit beneath it, and also to the oven. The oven is provided with a top plate 10 and a bottom plate 11, which plates are spaced from the top and bottom plates respectively of the stove to provide upper and lower horizontal flues 12 and 13, and the oven is also provided at one end with an end plate 14 which is spaced from the adjacent end plate 7 of the stove to provide a vertical or downtake flue 15 for the products of combustion. The opposite end of the oven is provided with an end plate 16, which is spaced from a partition plate 17 which extends transversely within the stove and divides the combustion chamber or space of the stove from the oven. The space between the plates 16 and 17 provides a flue 18 which communicates with the lower horizontal flue 13. The flue 18 is provided at its upper rear corner with an exit 19 which extends through the back plate 5 of the stove and communicates with a smoke-box 20, which is located at the rear of the stove, this smoke-box leading to the chimney exit 21 and having preferably a curved bottom wall, as shown by the dotted lines in Figure 2 and the full lines in Figure 3. Above the oven and the top plate 10 thereof is provided means for controlling the draft of the products of combustion from the fire pot or combustion chamber and for insuring uniform distribution of the heat of the products of combustion throughout the area of the stove top. Preferably and as shown, the back plate 5 of the stove is provided with an opening 22 which forms a direct outlet from the upper horizontal flue 12 to the smoke-box 20 and chimney exit 21. Within the flue 12 and extending between the top plate 10 of the oven and the top plate 2 of the stove is fixed a flue strip 23. This flue strip extends longitudinally of the stove top from a point approximately between the middle pair of lids 3 to a point about in line with the centers of the pair of lids 3, as shown clearly in Figures 1 and 2, at which latter point it terminates. The flue strip is also preferably located about midway between the front and back of the oven, or in other words, about midway of the width of the upper horizontal flue 12, measured in a direction from the front toward the back of the stove. A damper, preferably in the form of a plate 24, is also preferably mounted within the upper horizontal flue 12. As shown, this damper is pivoted at the point 25 which is closely adjacent to the rear plate 5 of the stove, this pivot point for the damper being adjacent to the outlet 22 for the upper horizontal flue 12. The damper is of such a length that when it is swung into one of its operative positions, its free end will engage or rest against the fixed longitudinal flue strip 23. The length of the damper and its pivot point, moreover, are so determined, in the preferred construction, that when the damper is swung into the position just described, the damper will extend in a line across the center of the middle rear lid and to the left of the right-hand rear lid 3, and the part of the upper flue 12, beneath the right-hand rear lid 3, will be substantially unobstructed by the damper. The damper, when swung into its other operative position, is adapted to lie against the rear plate 5 of the stove and to cover and close the outlet 22, which leads from the upper flue 12 to the chimney exit. The uptake flue 18 between the oven and the firebox preferably contains a flue strip 26 which extends downwardly and forwardly, at an angle of about 45 degrees from the lower edge of the chimney outlet 19 and in a direction inclined toward the front, to a point about midway of the depth of this uptake flue 18. The purposes of this diagonal flue strip within the lower flue 13, are to divert the products of combustion passing through this lower flue toward the front of the stove, thus insuring uniform heating of the oven at the front and back, and to direct the heat against the adjacent walls of the firebox and oven, thus insuring uniformly high temperature of the firebox and effective heating of the adjacent end of the oven. By thus diverting the products of combustion toward the front of the stove, the products of combustion are caused to fill and to travel throughout the depth of the uptake flue 18, measured in a forward and rearward direction, instead of short circuiting to the outlet or exit 19 which leads from the rear upper corner of this flue, and by using a flue strip of the character shown and described in the uptake flue, these results are accomplished without the necessity of using a flue strip in the bottom flue and which experience has shown, tends to accumulate soot in the bottom flue.

The operation of a stove or range constructed in accordance with the present invention, may be briefly described as follows: When the fire is first started in the stove, or when a strong draft is desired, or it is desired to utilize the top only of the stove for cooking purposes, the damper 24 is swung forwardly into the diagonal position shown by the full lines in Figure 1, the free end of the damper then resting against the fixed longitudinal division plate 23, and the damper uncovering the opening 22, which provides a direct outlet from the upper horizontal flue 12 to the chimney exit. The products of combustion from the combustion chamber of the stove will then flow longitudinally through the upper flue 12 from the combustion chamber or space 8 of the stove, toward the right in Figures 1 and 2, these products of combustion spreading out in a direction forwardly and rearwardly to the full width of the flue 12, measured in a direction forwardly and rearwardly, until the middle pair of lids 3 is reached. From this point on, the products of combustion flowing through the front half of the upper flue 12 continue to the right in a substantially straight course until the righthand end plate 7 is reached. The products of combustion flowing through the rear half of the upper flue, however, are diverted forwardly or diagonally as they travel toward the right, by the diagonally placed damper 24, and merge with the products of combustion flowing through the front half of the flue. All of the products of combustion then pass between the fixed longitudinal flue strip 23 and the front plate of the stove, and these products of combustion then flow around the righthand end of the flue strip 23 rearwardly and thence in a rearwardly and righthand diagonal direction, beneath the righthand rear lid 3 and a portion of the rear middle lid and through the outlet 22 to the chimney exit. By compelling the products of combustion to follow the path just described, it will be understood that the lefthand pair of lids 3 and the portion of the stove top adjacent thereto will be heated directly, in the usual way, from the firebox in the combustion chamber, the middle pair of lids and the portion of the stove top adjacent thereto will be equally or uniformly heated by the products of combustion flowing through the upper flue 12 to the full width thereof, the righthand front lid will be efficiently heated by the products of combustion, all of which are caused to pass beneath it or through the space between the longitudinal flue strip 23 and the front plate of the stove, and the righthand rear lid will also be efficiently heated by the products of combustion, all of which flow through that portion of the upper flue which is in rear of the flue strip 23 and the diagonally placed damper 24.

When it is desired to heat the oven for baking or other purposes, it is only necessary to swing the damper 24 from the full line position shown in Figure 1 to the dotted line position shown in that figure. The damper will then clear the upper horizontal flue 12 to its full width and the damper will lie flatwise against the rear plate 5 of the stove, covering and closing the direct draft outlet 22. All of the products of combustion from the combustion chamber or firebox of the stove are then compelled to pass around the oven before reaching the chimney exit. Inasmuch as the upper flue 12 is unobstructed throughout its width, the products of combustion will fill this flue to its full width as they flow from the combustion chamber or firebox beneath the stove top and above the oven top, thus insuring thorough and uniform heating of the entire stove stop and also the top of the oven. The products of combustion upon reaching the righthand downtake flue 15 will descend through this flue, filling the same to its entire width, and they will fill and flow through the lower horizontal flue 13. The diagonal flue strip 26, which is contained in the uptake flue, will permit the products of combustion to flow directly upwardly from the front part of the lower horizontal flue, but the remainder of the products of combustion will be diverted by this flue strip toward the front of the uptake flue, thus insuring filling of the uptake flue 18 with the products of combustion, to its full width, measured in a direction forwardly and rearwardly, thus preventing short circuiting of the products of combustion to the chimney exit. The products of combustion which flow upwardly in the flue 18 finally discharge therefrom through the outlet 19 which is formed in the upper rear corner of this flue and the products of combustion pass out through the smoke-box to the chimney exit 21.

The present invention insures uniform and efficient heating of the entire stove top, whether the draft for the products of combustion be direct to the chimney exit or around the oven. When the products of combustion are caused to pass around the oven, they are so distributed as to insure uniform and efficient heating of not only the top and bottom of the oven, but also both ends thereof. By providing the uptake flue between the combustion chamber and the adjacent end of the oven, the heat at this end of the oven is equalized with that at the opposite end and the top and bottom of the oven, and this result is attained efficiently by arranging the outlet for the products of combustion at the upper rear corner of this uptake flue and providing the flue strip in the uptake flue to insure filling the uptake flue from front to back, with the heated products of combustion.

I claim as my invention:—

1. A cooking stove or range having a combustion chamber, an oven, a top flue extending between the top of the oven and the stove top from the combustion chamber and having at its rear edge a direct outlet to the chimney exit and also communicating at its end with flues extending around the oven, a longitudinal flue strip fixed in said top flue, and a damper pivoted at one end at a point adjacent to the rear edge of the top flue and adapted to swing into a position parallel with the rear edge of the top flue to cover and close said direct outlet and to swing into a diagonal position across the rear portion of said top flue with its free end in cooperative relation with said flue strip.

2. A cooking stove or range having a top, a combustion chamber, a flue leading from the combustion chamber along the under side of said top, a direct-draft outlet being provided along the rear edge of said flue, a longitudinal flue strip fixed in said flue at the end thereof remote from the combustion chamber, and a damper pivoted at one end at a point adjacent to the rear edge of the flue and intermediately of the length of the flue, said damper adapted to lie in parallelism with the rear edge of the flue to cover and close said direct-draft outlet, and to swing horizontally into a position diagonally of the length of said flue with its free end forming a substantial continuation of said flue strip.

3. A cooking stove or range having a combustion chamber, an oven, a top provided with a set of lids two pairs of which are arranged above the oven, a top flue extending from the combustion chamber and above the oven and below said top, said flue having a direct-draft outlet in its rear edge, and other flues leading from the end of the top flue remote from the combustion chamber and extending around the oven, a flue strip extending longitudinally in said top flue from a point between the end pair of lids to the end of such flue, the portion of the top flue adjacent to the combustion chamber being undivided by said flue strip, and a damper pivoted at one end at the rear edge of said top flue at a point adjacent to the rear one of the next adjacent pair of lids, said damper being adapted to occupy a position in parallelism with the rear edge of the top flue to cover and close said direct-draft outlet and also adapted to swing horizontally into a position diagonally of the length of said top flue with its free end abutting the adjacent end of the flue strip.

In testimony whereof I have hereunto set my hand in presence of two subscribing witnesses.

LINN B. SULLIVAN.

Witnesses:
NORMAN I. MILLER,
JOHN L. WESTMORELAND.